United States Patent
Jung et al.

(10) Patent No.: US 9,063,648 B2
(45) Date of Patent: Jun. 23, 2015

(54) MOBILE TERMINAL AND OPERATING METHOD THEREOF

(75) Inventors: Jongcheol Jung, Seoul (KR); Jongkwon Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 373 days.

(21) Appl. No.: 12/946,782

(22) Filed: Nov. 15, 2010

(65) Prior Publication Data

US 2011/0279388 A1    Nov. 17, 2011

(30) Foreign Application Priority Data

May 14, 2010    (KR) .......................... 10-2010-0045533

(51) Int. Cl.
*G06F 3/041* (2006.01)
*G06F 3/033* (2013.01)
*G06F 3/0488* (2013.01)
*G06F 3/0481* (2013.01)

(52) U.S. Cl.
CPC .......... *G06F 3/04883* (2013.01); *G06F 3/0481* (2013.01); *G06F 3/041* (2013.01); *G06F 2203/04808* (2013.01)

(58) Field of Classification Search
CPC ............................. G06F 3/041; G06F 3/0481
USPC .......................................... 715/863; 345/173
See application file for complete search history.

(56) References Cited

U.S. PATENT DOCUMENTS

| | | | |
|---|---|---|---|
| 6,073,036 A * | 6/2000 | Heikkinen et al. ......... | 455/550.1 |
| 2007/0177803 A1* | 8/2007 | Elias et al. ..................... | 382/188 |
| 2008/0219427 A1* | 9/2008 | Naono et al. ............ | 379/218.01 |
| 2008/0284753 A1* | 11/2008 | Hsu et al. ....................... | 345/174 |
| 2010/0031202 A1* | 2/2010 | Morris et al. ................. | 715/863 |
| 2010/0156818 A1* | 6/2010 | Burrough et al. ............. | 345/173 |
| 2011/0285659 A1* | 11/2011 | Kuwabara et al. ............ | 345/173 |

* cited by examiner

*Primary Examiner* — Mark Regn
(74) *Attorney, Agent, or Firm* — Birch, Stewart, Kolasch & Birch, LLP

(57) ABSTRACT

A mobile terminal and an operating method thereof are provided. The operating method includes displaying an object list including one or more objects on a display module of the mobile terminal, detecting a first enlarge command from a first area of the display module where a particular object from the object list is displayed, the area indicating a targeted region within a predetermined distance from the particular object, wherein the first enlarge command corresponds to first positioning at least two touch points on the display module and then increasing a distance between the at least two touch points, and activating the particular object from the object list in response to the first enlarge command.

18 Claims, 15 Drawing Sheets

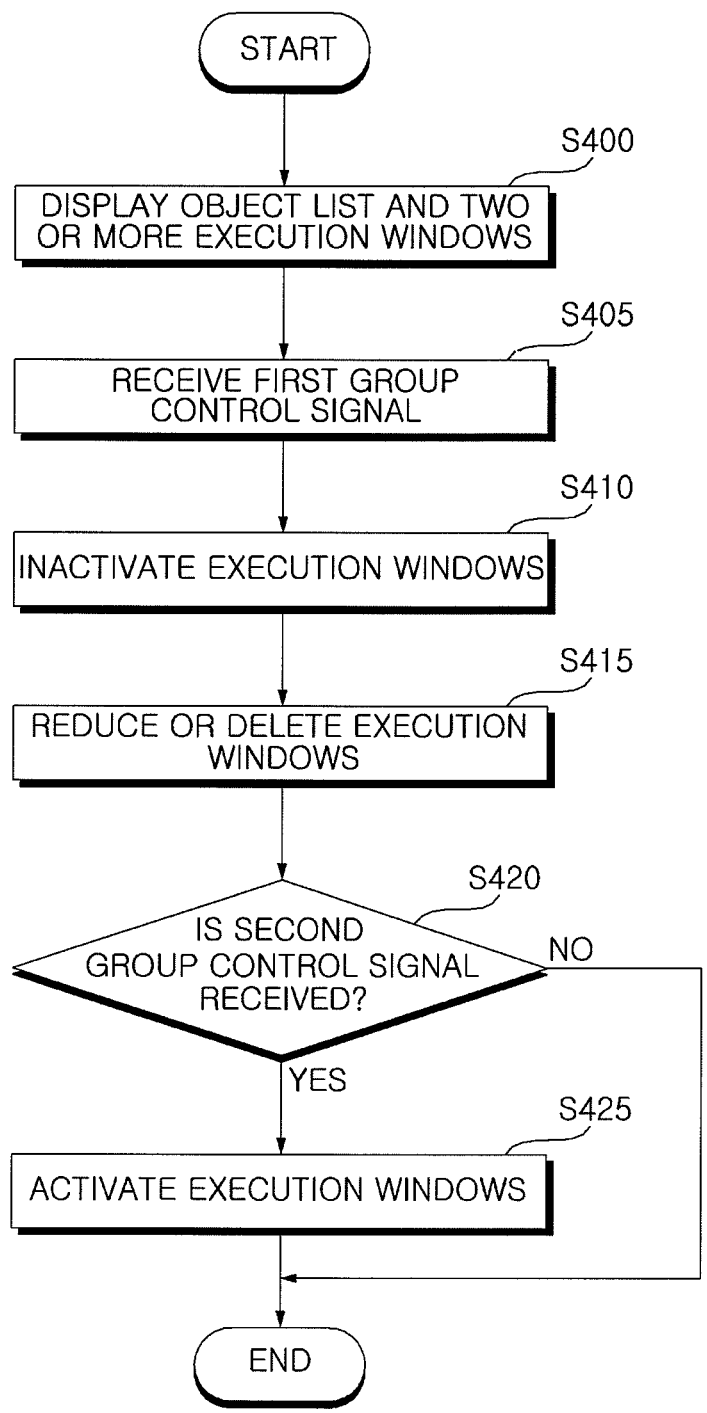

MOBILE TERMINAL AND OPERATING METHOD THEREOF

CROSS-REFERENCE TO RELATED APPLICATION

This application claims the priority benefit of Korean Patent Application No. 10-2010-0045533, filed on May 14, 2010 in the Korean Intellectual Property Office, the disclosure of which is incorporated herein by reference.

BACKGROUND OF THE INVENTION

1. Field of the Invention

The present invention relates to a mobile terminal with a touch screen function and an operating method thereof.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

An increasing number of mobile terminals are being equipped with a touch screen function, and thus, users can now use a variety of functions of mobile terminals with simple hand gestures. In particular, as the types of user interfaces (UIs) and applications that can be provided by mobile terminals diversify, it has become more possible to effectively control mobile terminals with intuitive hand gestures and maximize user convenience.

SUMMARY OF THE INVENTION

The present invention provides a mobile terminal capable of allowing a user to enlarge or activate various displayed objects with simple hand gestures and also capable of playing a content item corresponding to an icon touched by the user and displaying detailed information on the content item, and an operating method of the mobile terminal.

According to an aspect of the present invention, there is provided an operating method of a mobile terminal, the operating method including displaying an object list including one or more objects on a display module; and if an 'enlarge' command is detected from an area on the display module where one of the objects is displayed, activating the object displayed within the area, the 'enlarge' command being generated by setting at least two touch points on the display module and increasing a distance between the at least two touch points.

According to another aspect of the present invention, there is provided an operating method of a mobile terminal, the operating method including displaying an object list including at least one inactivated object and two or more activated objects and two or more windows respectively corresponding to the activated objects; and if a first group control signal is detected from the display module, inactivating the activated objects all together, the first group control signal being generated by dragging on the display module toward a first direction while touching more than a predefined percentage of the area of the display module.

According to another aspect of the present invention, there is provided a mobile terminal including a display module configured to display an object list including one or more objects thereon; and a controller, wherein, if an 'enlarge' command is detected from an area on the display module where one of the objects is displayed, the controller activates the object displayed within the area, the 'enlarge' command being generated by setting at least two touch points and increasing a distance between the at least two touch points.

According to another aspect of the present invention, there is provided a mobile terminal including a display module configured to display thereon an object list including at least one inactivated object and two or more activated objects and two or more windows respectively corresponding to the activated objects; and a controller configured to inactivate the activated objects all together if a group control signal is detected from the display module, the group control signal being generated by dragging on the display module toward a first direction while touching more than a predefined percentage of the area of the display module.

According to another aspect of the present invention, there is provided an operating method of a mobile terminal, the operating method including displaying an object list including one or more objects on a display module of the mobile terminal, detecting a first enlarge command from a first area of the display module where a particular object from the object list is displayed, the area indicating a targeted region within a predetermined distance from the particular object, wherein the first enlarge command corresponds to first positioning at least two touch points on the display module and then increasing a distance between the at least two touch points, and activating the particular object from the object list in response to the first enlarge command.

According to another aspect of the present invention, there is provided an operating method of a mobile terminal, the operating method including displaying an object list including at least one inactivated object, and two or more windows respectively corresponding to two or more activated objects on a display module of the mobile terminal, detecting a group control signal from the display module, wherein the group control signal corresponds to touching an area of a predetermined size on the display module and dragging the area to a predetermined direction, and executing the group control signal in response to the detected group control signal.

According to another aspect of the present invention, there is provided a mobile terminal including a display module configured to display an object list including one or more objects, and a controller configured to detect an enlarge command from an area of the display module where a particular object from the object list is displayed, and to activate the particular object within the area.

According to another aspect of the present invention, there is provided a mobile terminal including a display module configured to display an object list including at least one inactivated object and two or more windows respectively corresponding to two or more activated objects, and a controller configured to inactivate the activated objects all together if a group control signal is detected from the display module, the group control signal corresponding to dragging on the display module toward a first direction while touching more than a predefined percentage of the area of the display module.

BRIEF DESCRIPTION OF THE DRAWINGS

The above and other features and advantages of the present invention will become more apparent by describing in detail preferred embodiments thereof with reference to the attached drawings in which:

FIG. 8 illustrates a flowchart of an operating method of a mobile terminal, according to another exemplary embodiment of the present invention.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
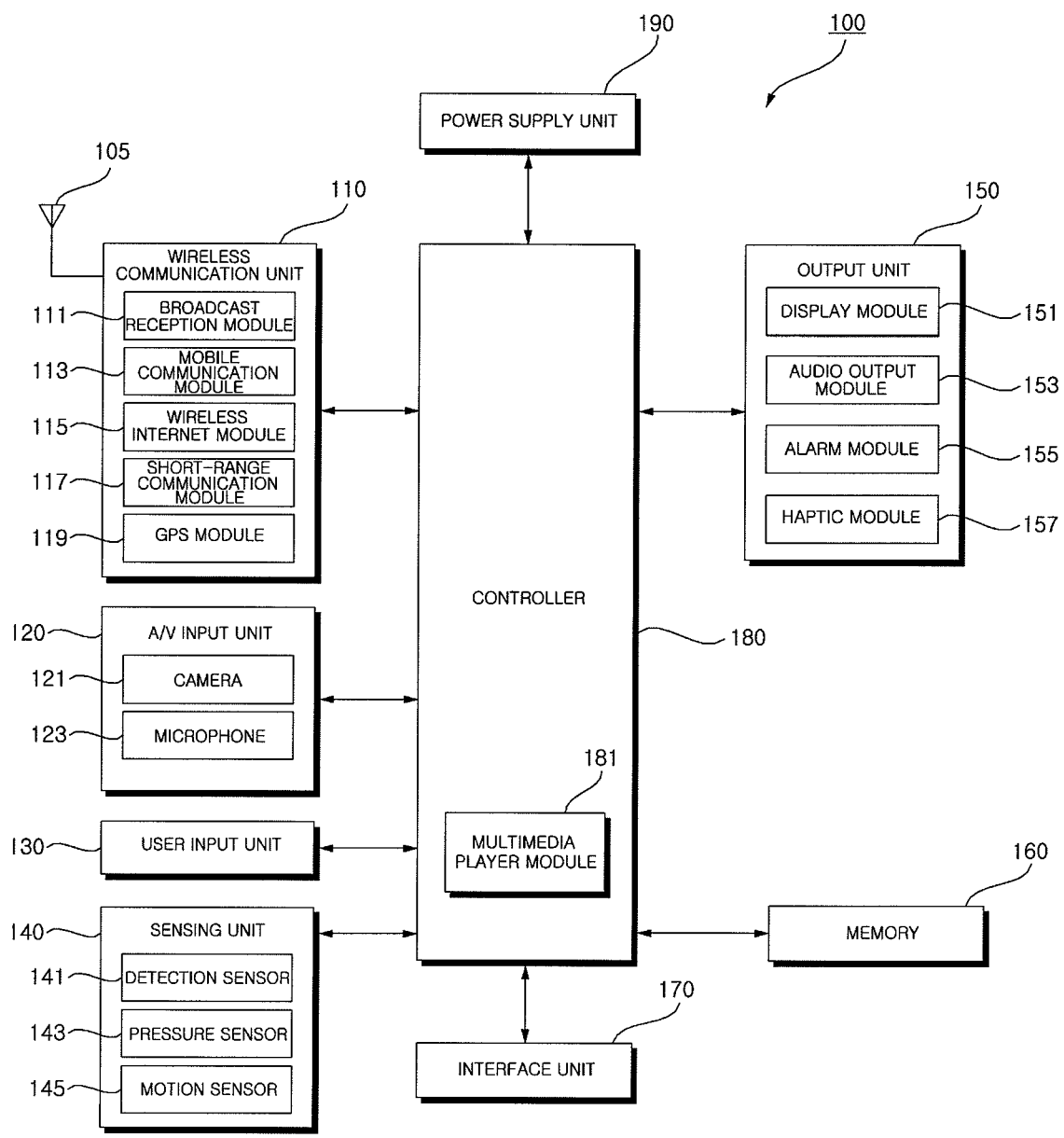
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by the user. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

As described above, the display module 151 may be configured to form a layer structure with a touch pad and may thus be able to serve as a touch screen capable of receiving a touch-based user command. If the display module 151 and the user input unit 130 form a layer structure together and are thus implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

Figure 2:
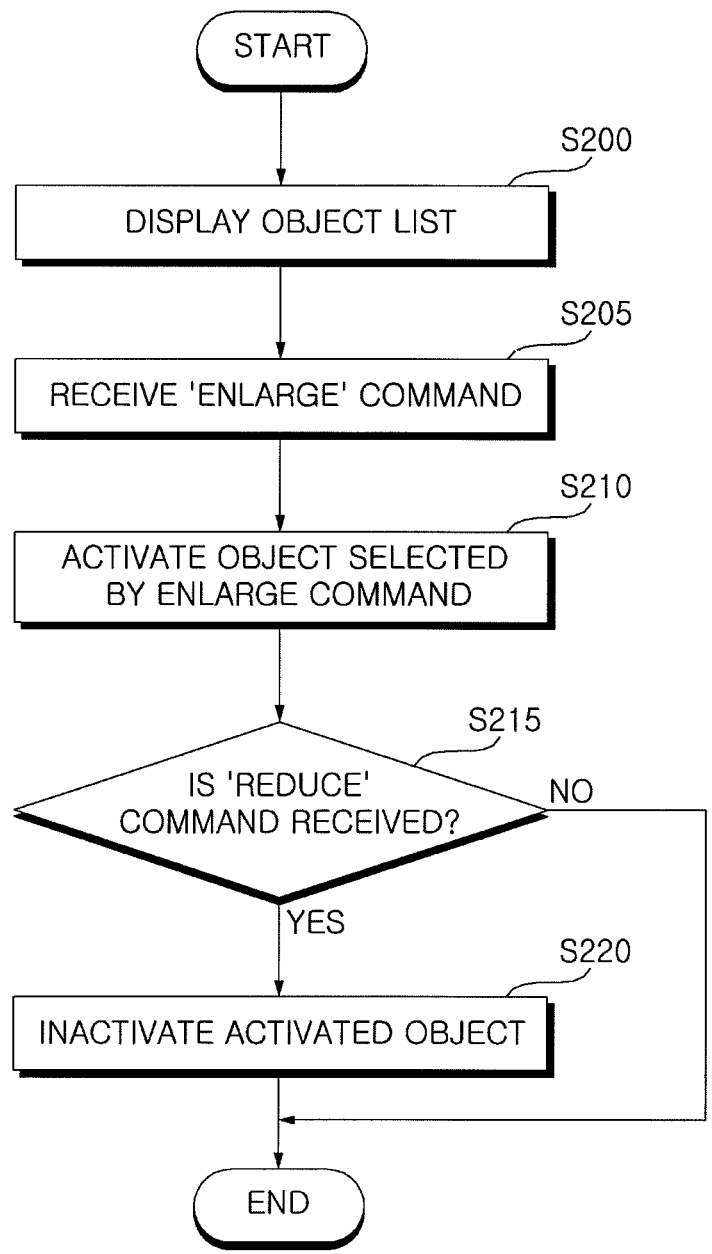
FIG. 2 illustrates a flowchart of an operating method of a mobile terminal, according to an exemplary embodiment of the present invention.

FIG. 2 illustrates a flowchart of an operating method of a mobile terminal, according to an exemplary embodiment of the present invention. The mobile terminal 100 can provide various UIs and can drive various applications. In addition, the mobile terminal 100 can play various multimedia data present in the memory 160 or received through the wireless communication unit 110. Applications and multimedia data may be displayed as a list of their respective icons. Thus, if an icon is activated, an application corresponding to the activated icon may be driven, or multimedia data corresponding to the activated icon may be played.

Referring to FIG. 2, the controller 180 may display a list of objects on the display module 151 (S200). The objects include, but are not restricted to, icons, menu items, submenu items of a menu item, and details of an icon or data file. Therefore, if the objects are icons, the object list displayed in operation S200 may be an icon list. If the objects are menus, the object list displayed in operation S200 may be a menu list. The objects may be rendered in the form of text or images. If the objects are icons, the objects may be rendered in the form of images. On the other hand, if the objects are menu items or details of an icon or data file, the objects may be rendered in the form of text.

The display module 151 may have a touch screen function. That is, the display module 151 and the user input unit 130 may form a layer structure together.

Thereafter, the controller 180 may receive an 'enlarge' command through the display module 151 (S205). The 'enlarge' command may be a user command generated when the user touches the display module 151 in a predefined manner.

More specifically, the user may touch the display module 151 in various manners and may thus enter an 'enlarge' command. For example, the user may enter an 'enlarge' command by touching an area in which a desired object is displayed with two fingers and may move the fingers apart from each other in order to enlarge the desired object. On the other hand, the user may enter a 'reduce' command by touching the area in which the desired object is displayed with two fingers and moving the fingers closer together. The user may not necessarily have to move the two fingers at the same time in order to enter an 'enlarge' or 'reduce' command. That is, the user can enter an 'enlarge' or 'reduce' command by moving only one of the two fingers apart from or closer to the other finger so as to increase or reduce the distance between the two fingers.

Thereafter, the controller 180 may activate one of the objects displayed in operation S200 in response to the 'enlarge' command received in operation S205 (S210). More specifically, when the user enters an 'enlarge' command for one or more icons, the icons may be selected and activated at the same time. The activation of an icon may involve playing multimedia data corresponding to the icon and driving an application corresponding to the icon. If an icon is activated, detailed information on the icon may be displayed. Various operations may be performed in connection with the activation of an icon. For example, if an icon representing a data file is activated, the data file may be opened. If an icon representing a multimedia file is activated, the multimedia file may be played. If an icon representing a music file or a video file is activated, the music file or the video file may be played. If an icon representing a game application is activated, the game application may be driven.

When an object is activated in response to an 'enlarge' command, the following operations may be performed: playing data corresponding to the activated object, driving an application corresponding to the activated object, displaying detailed information on the activated object, and displaying a UI image for deleting, editing or moving the data or application corresponding to the activated object.

The user may select or set what operation should be performed upon the activation of an object. For example, if a 'phonebook' icon is activated in response to an 'enlarge' command, a list of phone numbers may be displayed. Thereafter, if one of the phone numbers is activated in response to another 'enlarge' command, a call may be made to the activated phone number, or detailed contact information on the activated phone number may be displayed. The operation performed upon the activation of an icon may vary according to the type of the icon, and may be determined by a user setting or default setting in the mobile terminal 100.

If a 'reduce' command is received (S215), the controller 180 may inactivate the object activated in operation S210 (S220). The inactivation of an object may be interpreted as a process of terminating an application or the play of multimedia data. As a result of the inactivation of an object, a window for the object may be deleted. In short, the driving of an application or the play of multimedia data initiated by an 'enlarge' command may be terminated upon the receipt of a 'reduce' command.

Figure 3:
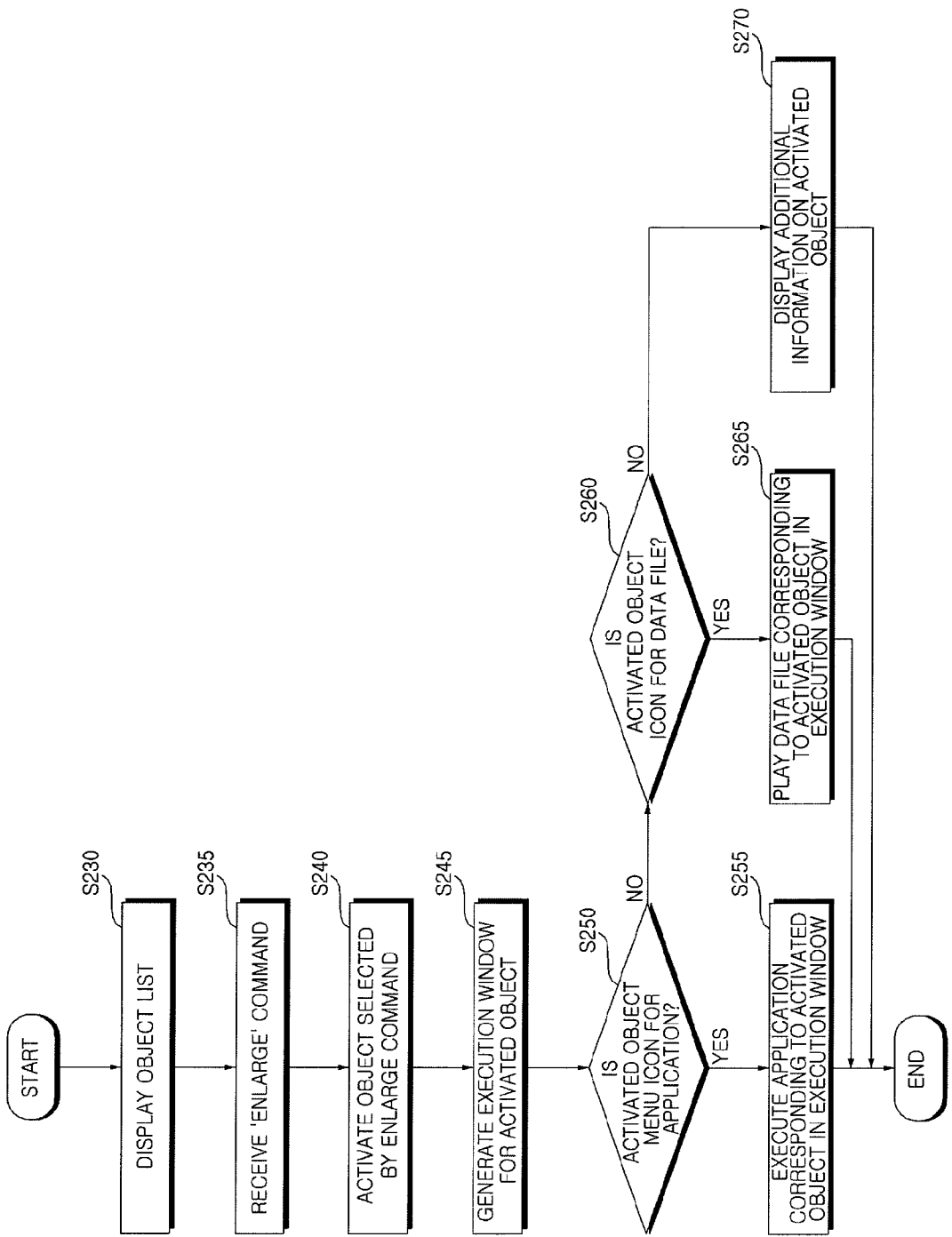
FIG. 3 illustrates a flowchart of an operating method of a mobile terminal, according to another exemplary embodiment of the present invention.

FIG. 3 illustrates a flowchart of an operating method of a mobile terminal, according to another exemplary embodiment of the present invention. Referring to FIG. 3, the controller 180 may display an object list on the display module 151 (S230). Thereafter, the controller 180 may receive an 'enlarge' command for one of a number of objects included in the object list (S235). More specifically, the user may enter an 'enlarge' command by touching the display module 151 in a predefined manner. The display module 151 may have a touch screen function and may form a layer structure with the user input unit 130. The 'enlarge' command entered by the user may be transmitted to the controller 180 via the user input unit 130. Any 'enlarge' command detected from an area within a certain range of an object may be regarded as specifically targeting the object.

The controller 180 may activate an object selected by the 'enlarge' command received in operation S235 (S240). Once the object selected by the 'enlarge' command received in operation S235 is activated, a display window may be displayed on the display module 151 in connection with the driving of an application corresponding to the activated object or the play of multimedia data corresponding to the activated object. A display window displayed upon the activation of an object will hereinafter be referred to as a window.

Thereafter, the controller 180 may generate a window for the object activated in operation S240 (S245). If more than one icon is activated by the 'enlarge' command received in operation S235, the controller 180 may generate a number of windows corresponding to the number of icons activated by the 'enlarge' command.

Thereafter, the controller 180 may determine whether the object activated in operation S240 is a menu icon representing an application (S250). If it is determined in operation S250 that the object activated in operation S240 is a menu icon representing an application, the controller 180 may execute the application corresponding to the menu icon (S255). Then, the controller 180 may generate a window for the application corresponding to the menu icon.

If it is determined in operation S250 that the object activated in operation S240 is not a menu icon for driving an application, the controller 180 may determine whether the object activated in operation S240 is an icon representing a data file (S260). If it is determined in operation S260 that object activated in operation S240 is an icon representing a data file, the controller 180 may play the data file corresponding to the icon (S265). During the play of the data file corresponding to the icon, a predetermined image may be displayed. In this case, a window may be provided, and the predetermined image may be displayed in the window.

If it is determined in operation S260 that the object activated in operation S240 is neither a menu icon for driving an application nor an icon representing a data file, the controller 180 may display additional information on the object activated in operation S240 on the display module 151 (S270). For example, if the object activated in operation S240 is a menu icon for driving an application that cannot be readily driven or if the object activated in operation S240 is an icon representing data or an application that has already been deleted, the controller 180 may display the additional information on the object activated in operation S240 on the display module 151.

Even if the object activated in operation S240 is a menu icon for driving an application or an icon representing a data file, the controller 180 may also display the additional information on the object activated in operation S240 on the display module 151 if necessary.

Figure 4:
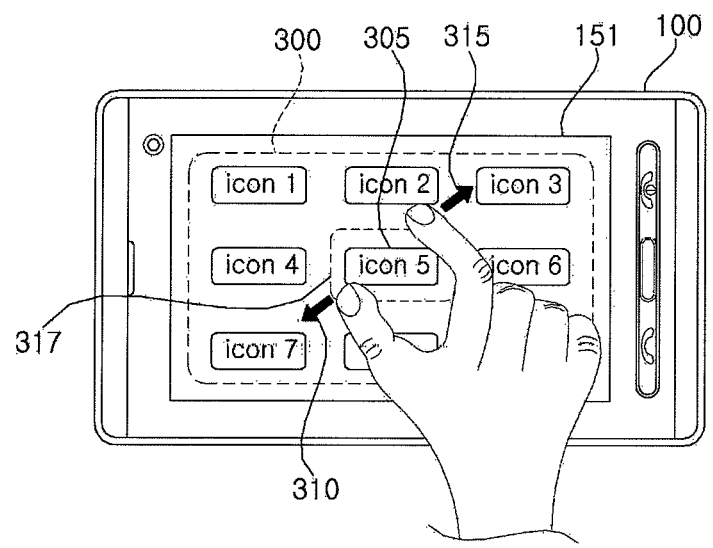
FIGS. 4 through 7B illustrate diagrams of various display screens for explaining the exemplary embodiments of FIGS. 2 and 3.

FIG. 4 illustrates a diagram of an example of a display screen showing an object list. Referring to FIG. 4, an icon list 300 including a plurality of icons may be displayed on the display module 151 as an example of an object list. In order to play multimedia data corresponding to one of the icons, e.g., a fifth icon 305, or drive an application corresponding to the fifth icon 305, the user may enter an 'enlarge' command for the fifth icon 305 by touching an area 317 on the display module 151 including the fifth icon 305 and its surrounding area. That is, the user may not necessarily have to touch the exact area where the fifth object 305 is displayed in order to enter an 'enlarge' command for the fifth object 305. A touch gesture detected from an area within a predetermined range of the fifth object 305 may be interpreted as being associated with an attempt to enter an 'enlarge' command for the fifth object 305.

The display module 151 may have a touch screen function and may form a layer structure with the user input unit 130 (such as a touch pad).

In order to enter an 'enlarge' command, two or more touch points may need to be set on the display module 151 and at least one of the touch points may need to be moved in a predetermined direction. For example, the user may set first and second touch points within the area 317 by touching the area 317 with two fingers and then moving at least one of the two fingers apart from the other finger so as to increase the distance between the two fingers.

Referring to FIG. 4, the user may touch the area 317 on the display module 151 with a thumb and an index finger, and may move the thumb and the index finger in first and second directions 310 and 315, respectively. In this case, the user may not necessarily have to move both the thumb and the index finger at the same time. That is, the user may only have to increase the distance between the thumb and the index finger and may thus be allowed to move only one of the thumb and the index finger apart from the other.

An icon or a window for an icon may be enlarged in response to an 'enlarge' command. The size and shape to which an icon or a window for an icon is enlarged in response to an 'enlarge' command may be determined by the final locations of first and second touch points associated with the 'enlarge' command. For example, an icon or a window for an icon is enlarged to the size and shape of a rectangle whose diagonal line coincides with an imaginary line drawn between the final locations of first and second touch points associated with an 'enlarge' command.

The rate at which an icon or a window for an icon is enlarged in response to an 'enlarge' command may vary according to the moving speed and acceleration of first and second touch points associated with the 'enlarge' command. In this case, the higher the moving speed and acceleration of first and second touch points associated with an 'enlarge' command, the greater the amount by which an icon or a window for an icon is enlarged in response to the 'enlarge' command, regardless of the final locations of the first and second touch points.

Figure 5A:
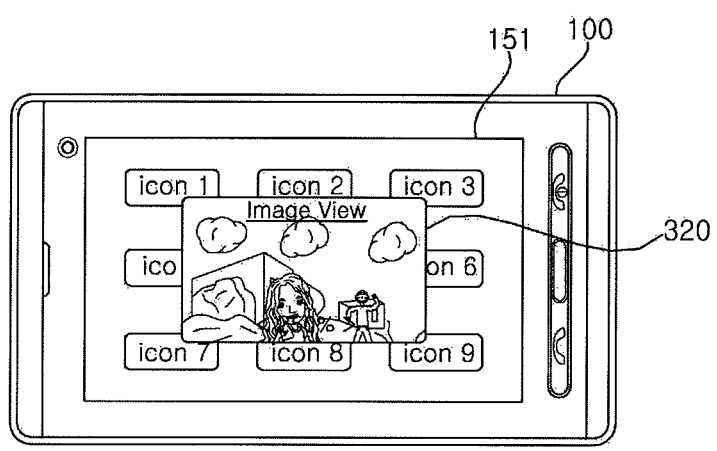
Figure 5B:
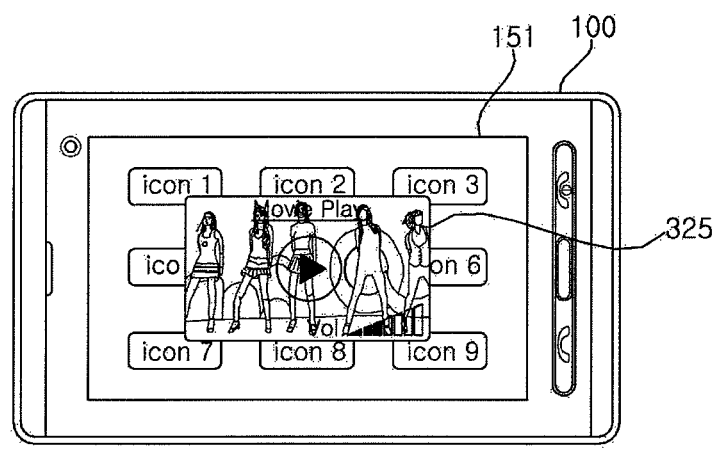
Figure 5C:
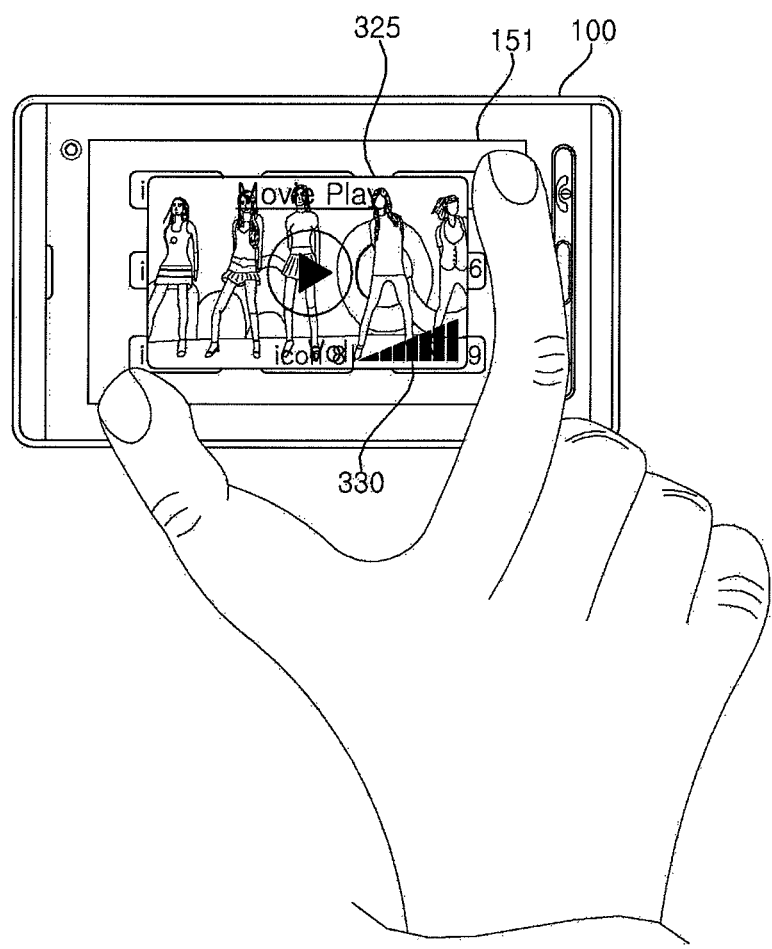

FIGS. 5A through 5C illustrate diagrams of various examples of a display screen showing an icon list and a window. Referring to FIG. 5A, if an 'enlarge' command is detected from a fifth icon 305 and the fifth icon 305 represents an image file, a window 320 showing the image file may be displayed.

Referring to FIG. 5B, if an 'enlarge' command is detected from a fifth icon 305 and the fifth icon 305 represents a video file, a window 325 in which the video file is played may be displayed.

Referring to FIG. 5C, if an 'enlarge' command is detected from a window corresponding to an already-activated icon, i.e., the window 325, the window 325 may be enlarged, or the sound volume may be increased. In the latter case, the user can easily identify the change in the sound volume from a volume display 330.

If an 'enlarge' command is detected from a window corresponding to an already activated icon, various other operations than enlarging the window or adjusting the sound volume may be performed. For example, an 'enlarge' command detected from a window where an application for capturing a photo is being driven may be interpreted as a command to increase the resolution or size of a preview image to be captured or a control signal for zooming in or out. An 'enlarge' command detected from a window for an activated menu icon may be interpreted as a command to move to a submenu.

An 'enlarge' command detected from a window for an application or a data file may be interpreted as a command to display additional information on the application or the data file. The term "additional information on a data file" includes, but is not restricted to, file name, date of last modification, memos and size. The term "additional information on an application" includes, but is not restricted to, instructions on how to use the application and descriptions of the features and advantages of the application.

Figure 6A:
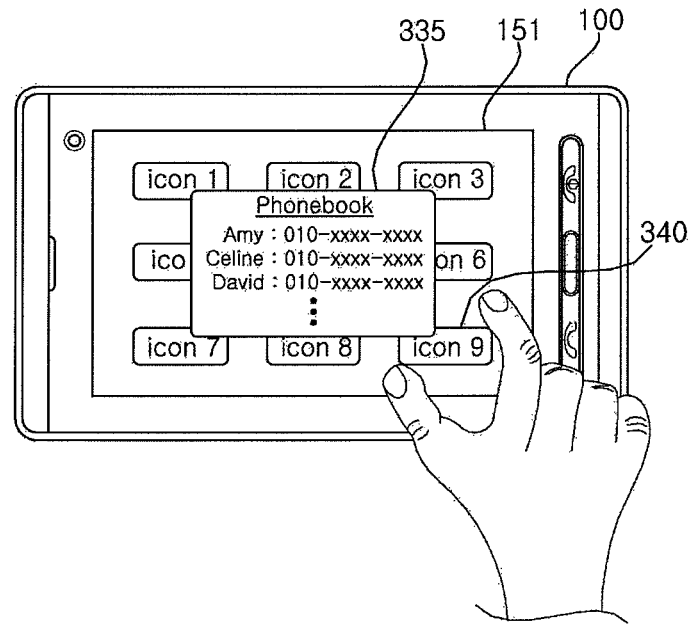
Figure 6B:
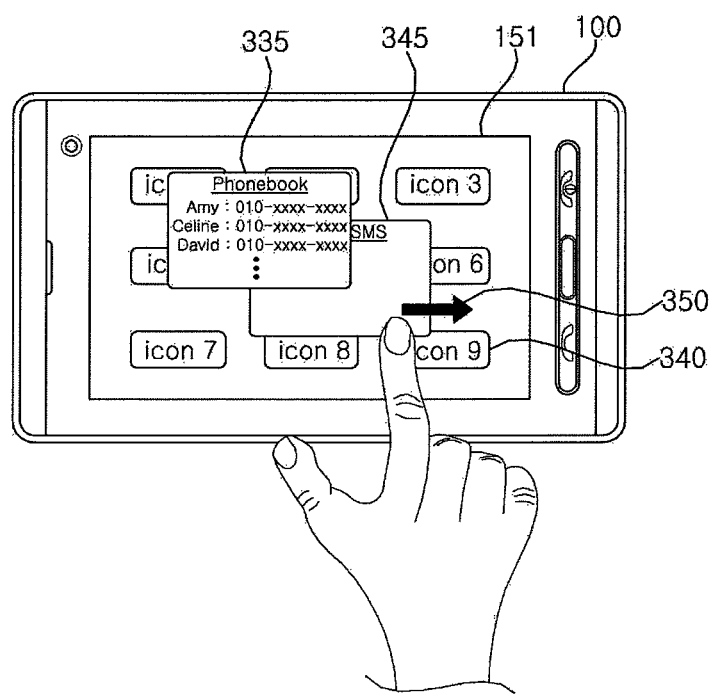

FIGS. 6A through 6D illustrate diagrams of various display screens for explaining how to display an icon list and a plurality of execution windows. Referring to FIGS. 6A and 6B, if an 'enlarge' command for a ninth icon 340 is received when a first window 335 showing a list of contacts stored in the memory 160 is displayed, a second window 345 for the ninth icon 340 may be additionally displayed.

A plurality of 'enlarge' commands for different icons can be input to the mobile terminal 100 either at the same time or in a row. Two or more windows can be displayed for an icon at the same time in response to an 'enlarge' command. For example, two or more applications can be driven at the same time, two or more data files can be played at the same time, and the playing of a data file and the driving of an application can be performed at the same time. That is, it is possible to realize multitasking with the mobile terminal 100.

When there are a plurality of windows displayed on the display module 151 as a result of multitasking, the user can move each of the windows around, if necessary, using a touch screen function. More specifically, referring to FIG. 6B, first and second windows 340 and 345 may pop up on the display module 151 at the same time, and the second window 345 is partially hidden from view by the first window 340. If a touch point is detected from the second window 345 and then the touch point moves in a direction 350, the controller 180 may move the second window 345 according to the movement of the touch point. Even when there are a plurality of windows displayed on the display module, not only an 'enlarge' or 'reduce' command but also a user signal for moving a window can be entered for each of the windows individually, and the windows can be moved around individually on the display module 151.

Figure 6C:
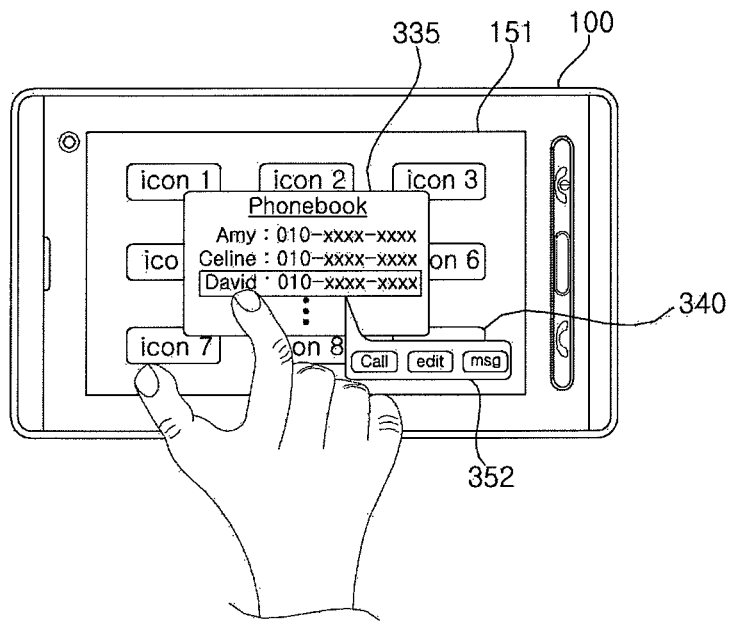
Figure 6D:
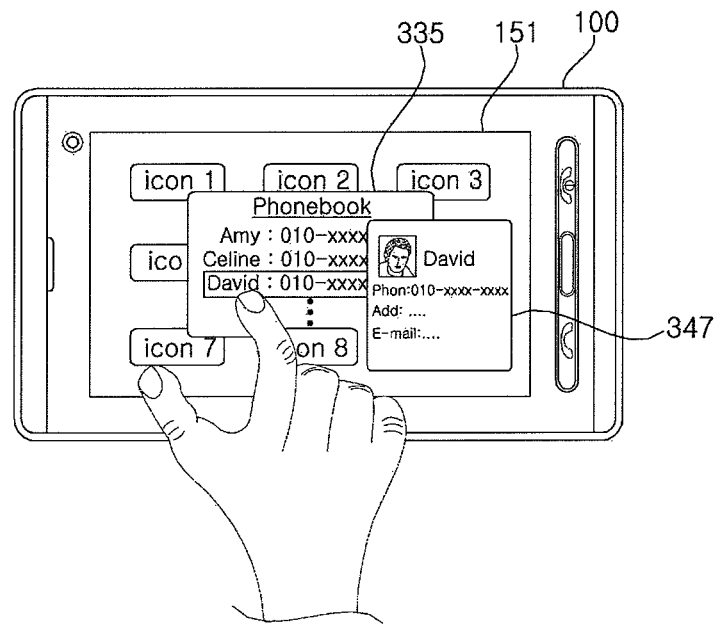

FIGS. 6C and 6D illustrate various examples of an operation that can be performed in response to an 'enlarge' command. Referring to FIG. 6C, when a phonebook application is being driven as a result of the activation of a corresponding icon and a first window 335 for the phonebook application is displayed on the display module 151, the user may select one of a plurality of objects displayed in the first window 335, and enter an 'enlarge' command for the selected object. Then, a menu image 352 for choosing one of a plurality of operations that can be performed on the selected object may be displayed. As a result, the user may make a call to a contact corresponding to the selected object, edit information on the contact, or send a message to the contact by choosing "Call," "Edit," or "Msg" from the menu image 352. For example, if the user chooses "Edit" from the menu image 352, a detailed information window 347 showing detailed information on the contact corresponding to the selected object may be displayed, as shown in FIG. 6D, thereby allowing the user to edit the corresponding contact's information. Alternatively, the detailed information window 347 may be displayed, without a requirement to display the menu image 352 and choose "Edit" therefrom, upon the receipt of an 'enlarge' command entered for the selected object.

The user can set in advance what operation should be readily performed in response to the receipt of an 'enlarge' command for each of the objects shown in the first window 335.

Alternatively, referring to FIG. 6D, if the user selects one of the objects displayed in the first window 335 and enters an 'enlarge' command for the selected object, a detailed information window 347 showing detailed information on a contact corresponding to the selected object may be displayed.

FIGS. 6A through 6D illustrate how to process an 'enlarge' command, taking a 'Contacts' icon and a phonebook application as an example. However, the present invention can be applied to various other applications than a phonebook application. For example, if an 'enlarge' command is entered for a 'Photos' icon, a plurality of photos may be displayed. Then, if one of the photos is selected and another 'enlarge' command is entered for the selected photo, various operations such as editing the selected photo, enlarging the selected photo or sending a multimedia mail including the selected photo may be performed. The embodiment of FIGS. 6A through 6D can be applied to nearly all types of objects such as menus, applications or data files that can be displayed, driven or played in connection with the activation of icons.

Figure 7A:
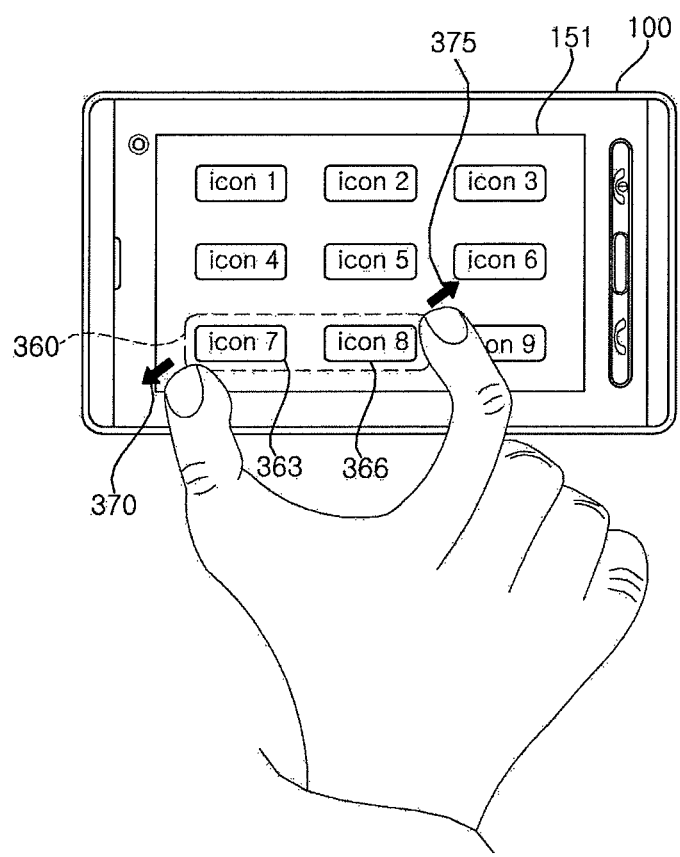
Figure 7B:
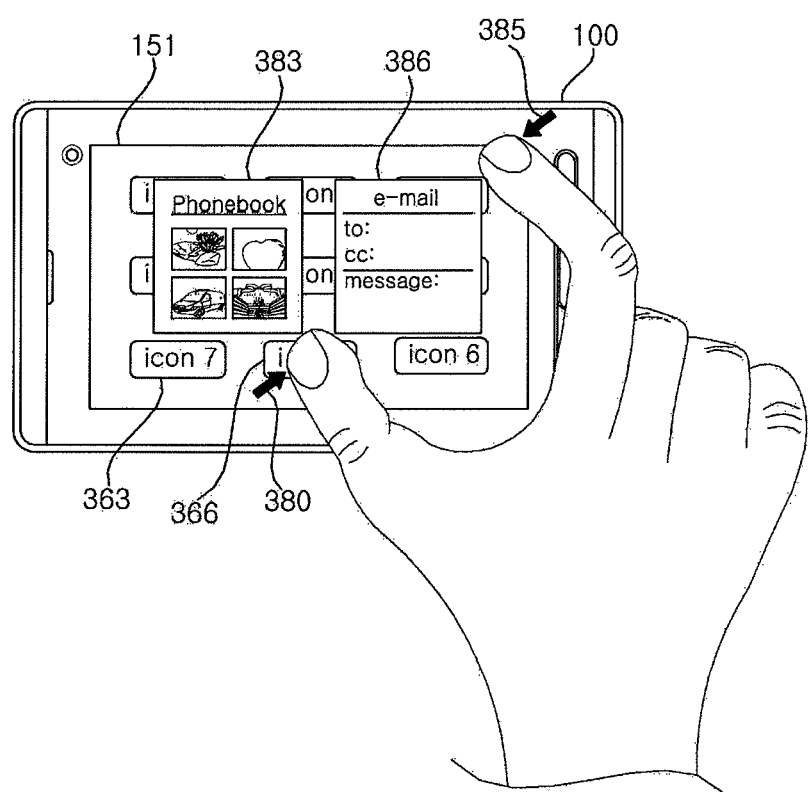

FIGS. 7A and 7B illustrate diagrams for explaining how to enter an 'enlarge' or 'reduce' command when a plurality of windows are displayed on the display module 151. Referring to FIG. 7A, an 'enlarge' command can be entered for two or more icons at a time. More specifically, if two touch points are detected from the display module 151 and at least one of the two touch points moves away from the other touch point, as indicated by reference numeral 370 or 375, it may be determined that an 'enlarge' command has been entered. Since two icons, i.e., seventh and eighth icons 363 and 366, are included in a target area 360 defined by the two touch points, the controller 180 may determine that an 'enlarge' command for each of the seventh and eighth icons 363 and 366 has been entered, and may generate a control signal for each of the seventh and eighth icons 363 and 366 accordingly.

As a result, referring to FIG. 7B, a third window 383 for the seventh icon 363 and a fourth window 386 for the eighth icon 366 may be displayed. In this case, the user may enter a 'reduce' command for the fourth window 386 by, for example, setting two touch points within the fourth window 386 and moving at least one of the touch points closer to the other touch point, as indicated by reference numeral 380 or 385, as if to reduce the fourth window 386. Then, the fourth window 386 or the eighth icon 366 may be inactivated. For example, if the fourth window 386 is a window for driving an email application, as shown in FIG. 7B, the email application may be terminated.

Alternatively, the fourth window 386 may simply be reduced or may be deleted in response to a 'reduce' command, instead of being inactivated or accompanying the inactivation of the eighth icon 366.

FIG. 8 illustrates a flowchart of an operating method of a mobile terminal, according to another exemplary embodiment of the present invention. Referring to FIG. 8, in a multitasking environment where the mobile terminal 100 drives two or more applications or plays two or more data files, two or more windows may be displayed on the display module 151 (S400).

Thereafter, a group control signal may be entered for all the windows (S405). A group control signal may be entered using the display module 151 or the user input unit 130, which forms a layer structure with the display module 151. More specifically, a group control signal may be generated by dragging on the display module 151 while touching more than a predefined percentage of the area of the display module 151, for example, by dragging the palm of a hand across the display module 151. Different operations may be performed according to the direction of a drag associated with a group control signal. For example, if the user drags down on the display module 151 while touching more than a predefined percentage of the area of the display module 151, it may be determined that a group control signal for closing a plurality of windows currently being activated and inactivating the objects corresponding to the windows is entered. On the other hand, if the user drags up on the display module 151 while touching more than the predefined percentage of the area of the display module 151, it may be determined that a group control signal for activating a plurality of windows yet to be activated and the objects corresponding to the windows is entered. For convenience, a group control signal for inactivating a plurality of windows all together will hereinafter be referred to as a first group control signal, and a group control signal for activating a plurality of windows all together will hereinafter be referred to as a second group control signal.

If a first group control signal is received through the user input unit 130 or the display module 151 (S405), the controller 180 may inactivate the windows displayed in operation S400 or their respective objects (S410). Thereafter, the controller 180 may reduce the size of the windows or may delete the windows (S415).

Thereafter, the controller 180 may determine whether a second group control signal has been received (S420). The second group control signal, like the first group control signal, may be generated by dragging on the display module 151 while touching more than a predefined percentage of the area of the display module 151. The direction of a drag associated with the second group control signal may be different from the direction of a drag associated with the first group control signal. If it is determined in operation S420 that the second group control signal has been received, the controller 180 may activate all the objects that have been inactivated in response to the first group control signal (S425). Thereafter, the controller 180 may restore the windows that have been reduced or even deleted in response to the first group control signal to their original state.

In short, the user can enter a group control signal by making a simple, intuitive hand gesture such as dragging the palm of a hand across the display module 151 and can thus effectively control a plurality of windows all together.

Figure 9A:
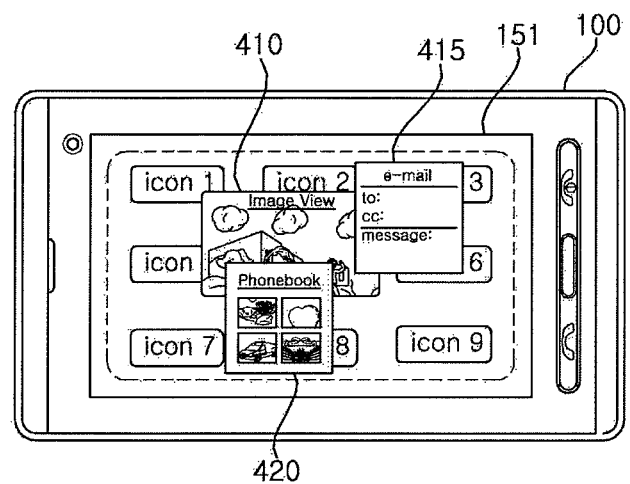
FIGS. 9 through 11C illustrate diagrams of various display screens for explaining the exemplary embodiment of FIG. 8.

FIGS. 9 through 11C illustrate diagrams of various display screens for explaining how to control a plurality of objects, e.g., a plurality of windows, all together. Referring to FIG. 9, a plurality of first, second and third windows 410, 414 and 420 may be displayed over a display screen showing a list of icons. The first window 410 may be a window for playing an image file, the second window 415 may be a window for driving an email application, and the third window 420 may be a window for driving a phonebook application or displaying submenus of a phonebook menu. The first, second and third windows 410, 415 and 420 may be displayed during multitasking, for example, when the playing of a data file and the driving of more than one application are performed at the same time.

Figure 9B:
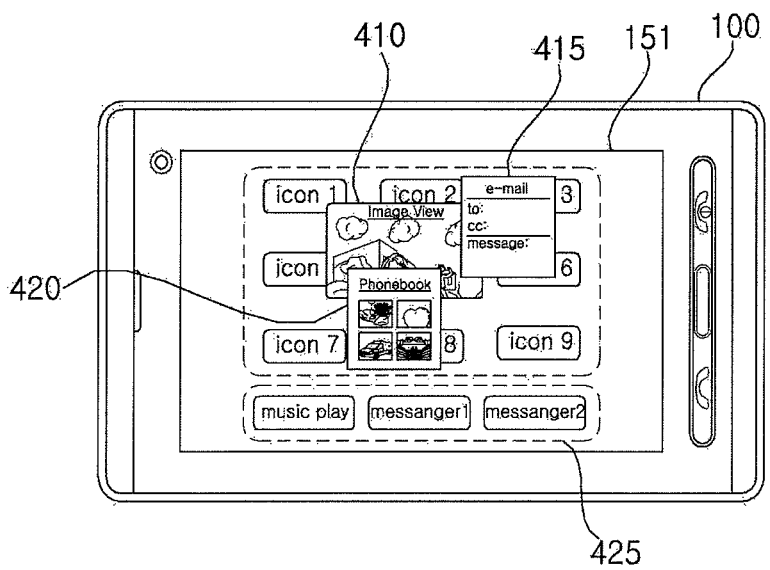

Referring to FIG. 9B, if the number of windows activated during multitasking exceeds a predefined value, all or at least some of the windows may be rearranged or minimized.

Even if a window is minimized, the playing of a data file or the driving of an application performed in the window may not be terminated. When a window is minimized, only the title of the window may be displayed on the display module 151, or the window may be displayed in one area on the display module 151 in its minimum size.

Referring to FIG. 9B, a minimized window list 425 showing a number of windows that are minimized but are still being processed, i.e., 'Music Play,' 'Messenger 1,' and 'Messenger 2,' may be displayed in one area on the display module 151, thereby making a total of six activated windows including the first, second and third windows 410, 415 and 420, which are yet to be rearranged.

The user may set in advance whether windows should be rearranged or minimized in response to a group control signal. In addition, the rearrangement of windows may be performed either automatically or manually. That is, the user may manually select a window to be minimized. Windows may be rearranged in various fashions in response to a group control signal. For example, windows may be cascaded or tiled vertically or horizontally according to a user setting or a default setting in the mobile terminal 100, and this will be described later in further detail with reference to FIGS. 11B and 11C.

When a plurality of windows are displayed, it may be determined which of the windows should be minimized first and which of the windows should be maintained. That is, windows may be minimized according to the priority of their respective data files or applications. For example, since audio files or antivirus software programs do not necessarily require the display of images, windows for audio files or antivirus software programs may be minimized first. In addition, windows that have not been used or have not received user signals for more than a predefined amount of time since being activated or least recently activated windows may be minimized first.

The rearrangement of windows may be performed in consideration of the order in which the windows were activated or last modified. For example, windows may be sequentially stacked in the order to which they were activated, such that a most recently activated window can be displayed at the top of the window stack, and that a least recently activated window can be displayed at the bottom of the window stack.

In short, for applications or data files that do not necessarily require the display of windows, the controller 180 may display small or minimized windows or may make their respective icons distinctive using various visual effects such as shading or highlighting.

The rearrangement and minimization of windows may be performed at the same time. That is, when there are too many windows open, the controller 180 may minimize some of the windows and rearrange the other windows according to a predefined set of rules.

Even windows that are supposed to be rearranged or minimized may be suspended from rearrangement or minimization if they are in the middle of being edited or receiving signals from the user.

Figure 10A:
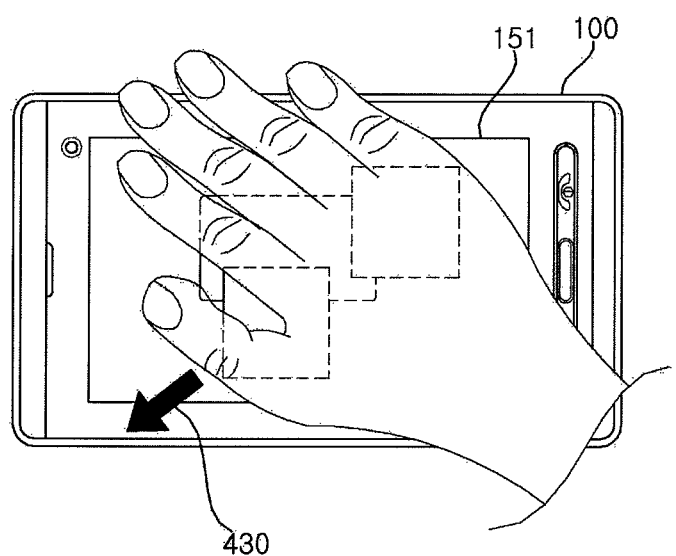
Figure 10B:
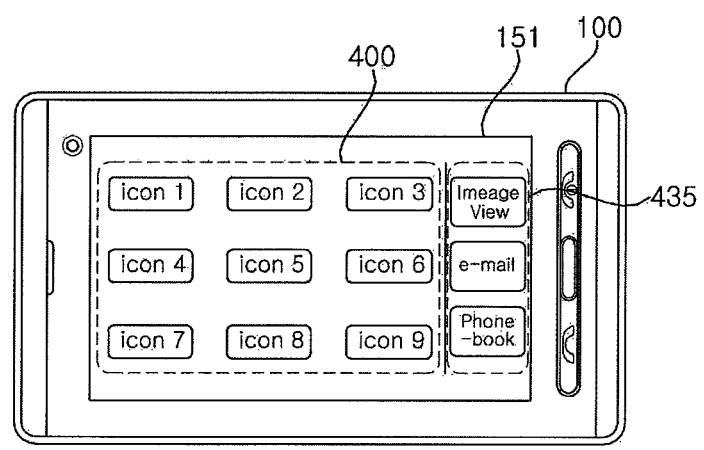

FIGS. 10A and 10B illustrate diagrams for explaining how to enter a first group control signal. Referring to FIG. 10A, the user may cover more than a predefined percentage of the area of the display module 151 with the palm of a hand and drag the hand across the display module 151 in a first direction 430, thereby entering a first group control signal through the display module 151 or the user input unit 130, which forms a layer structure with the display module 151, for inactivating first, second and third windows 410, 415 and 420 all together.

Then, referring to FIG. 10B, the first, second and third windows 410, 415 and 420 may all be deleted, and a minimized window list 435 showing the deleted windows or their respective icons may be displayed on one side of an icon list 400. The minimized window list 435 may be optional. More specifically, there may be a user setting or default setting in the mobile terminal 100 that determines whether to display the minimized window list 435 upon the deletion or minimization of windows in response to a first group control signal.

Figure 11A:
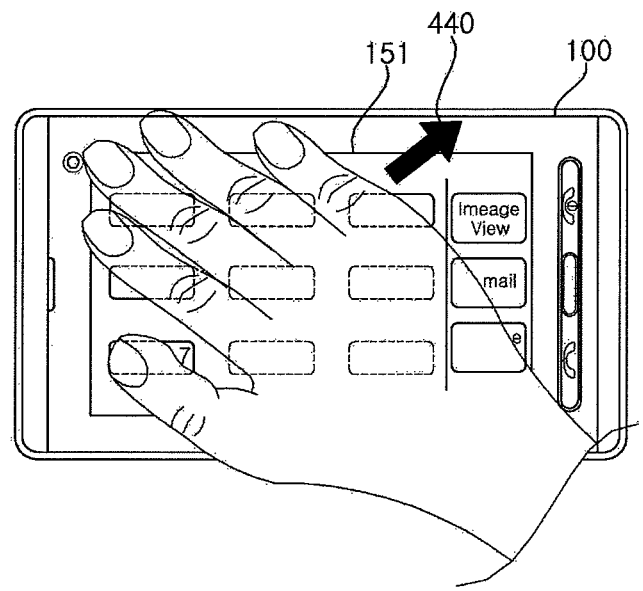

FIG. 11A illustrates a diagram for explaining how to enter a second group control signal. Referring to FIG. 11A, the user may cover more than a predefined percentage of the area of the display module 151 with the palm of a hand and drag the hand across the display module 151 in a second direction 440, thereby entering a second group control signal.

Figure 11B:
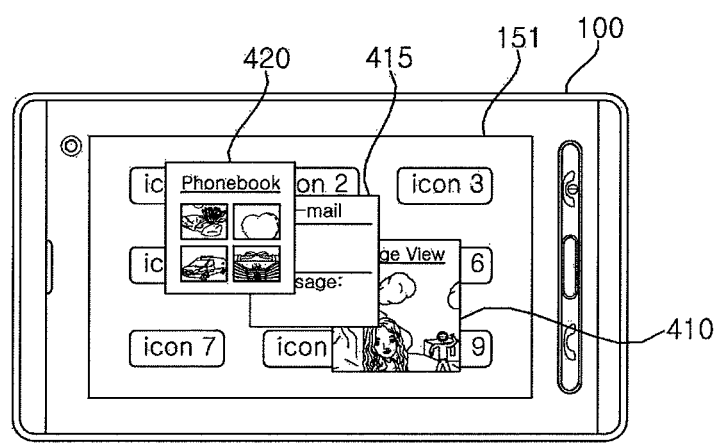
Figure 11C:
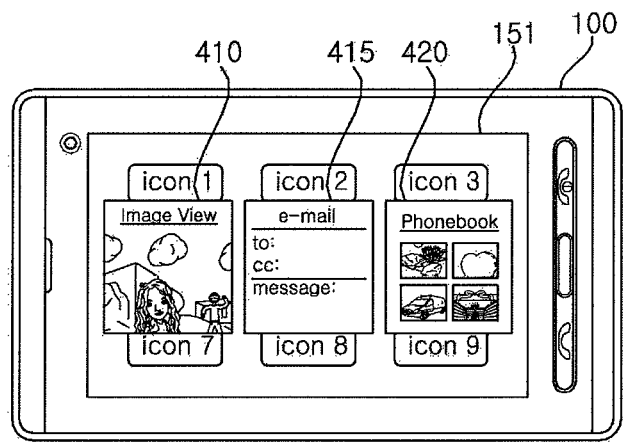

Referring to FIGS. 11B and 11C illustrate diagrams for explaining various examples of how to rearrange a plurality of windows. Referring to FIGS. 11B and 11C, a plurality of windows may be deleted or minimized in response to a first group control signal and may then be restored and rearranged in response to a second group control signal.

More specifically, once reactivated in response to a second group control signal, first, second and third windows 410, 415 and 420 may be cascaded and may all be displayed in the same size. More specifically, the first, second and third windows 410, 415 and 420 may be displayed in the order in which they were activated last modified, or reactivated. That is, the controller 180 may rearrange the first, second and third windows 410, 415 and 420 in the order in which they were activated last modified, or reactivated.

Referring to FIG. 11C, once reactivated in response to a second group control signal, windows may be tiled horizontally and may all be displayed in the same size. However, the rearrangement of windows reactivated in response to a second group control is not restricted to those set forth herein.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to enlarge or reduce a display screen, activate and drive an application of interest and play a data file of interest with a simple hand gesture. In addition, even when there are a plurality of windows open, it is possible to control the windows all together with a simple intuitive hand gesture, especially in a multitasking environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operating a mobile terminal, the operating method comprising:
 displaying a plurality of icons on a display module of the mobile terminal;
 receiving a first input from a first area wherein the first area includes at least two icons among the plurality of icons, wherein the first input initially corresponds to at least two touch points being positioned in the first area on the display module and wherein the distance between the at least two touch points is subsequently increased;
 in response to the first input, displaying at least two execution windows corresponding to each of the at least two icons on the display module;

automatically arranging the at least two execution windows on the display module such that the at least two execution windows do not overlap each other; and in response to a control signal detected from the display module, terminating the at least two execution windows simultaneously, the control signal being generated by touching and dragging more than a predetermined percentage of an area of the display module.

2. The operating method of claim 1, further comprising:
when a first icon of the at least two icons is a menu icon, performing a function corresponding to the menu icon in the first execution window.

3. The operating method of claim 1, further comprising:
when a first icon of the at least two icons is an icon representing a data file that can be played, playing the data file in a first execution window of the at least two execution windows.

4. The operating method of claim 1, further comprising:
displaying additional information about a first icon of the at least two icons in a first execution window of the at least two execution windows.

5. The operating method of claim 1, further comprising:
detecting an enlarge command from a first execution window of the at least two execution windows; and
enlarging the first execution window by a predetermined size in response to the enlarge command.

6. The operating method of claim 1, further comprising:
moving a first execution window of the at least two execution windows to a different location on the display module,
wherein the different location corresponds to a location where the first execution window has been touched and dragged to.

7. The operating method of claim 1, further comprising:
detecting a terminate command on the display module; and
terminating an activated first application corresponding to a first icon of the at least two icons in response to the terminate command.

8. The operating method of claim 1,
wherein a plurality of first applications is associated respectively with a plurality of first icons among the at least two icons, and
wherein the displaying a first execution window of the at least two execution windows comprises displaying a plurality of first execution windows corresponding to the plurality of first icons simultaneously.

9. The operating method of claim 8, further comprising
detecting a terminate command on the display module; and
terminating the plurality of first execution windows simultaneously.

10. The operating method of claim 1, wherein a first icon of the at least two icons representing a first execution window of the at least two execution windows is displayed next to at least one other icon of the at least two icons on the display module.

11. A mobile terminal comprising:
a display module configured to display a plurality of icons; and
a controller configured to:
receive a first input from a first area wherein the first area includes at least two icons among the plurality of icons, wherein the first input initially corresponds to at least two touch points being positioned in the first area on the display module and wherein the distance between the at least two touch points is subsequently increased,
in response to the first input, display at least two execution windows corresponding to each of the at least two icons on the display module,
automatically arrange the at least two execution windows on the display module such that the at least two execution windows do not overlap each other, and
in response to a control signal detected from the display module, terminating the at least two execution windows simultaneously, the control signal being generated by touching and dragging more than a predetermined percentage of an area of the display module.

12. The mobile terminal of claim 11, wherein, when a first icon of the at least two icons is a menu icon, the controller performs a function corresponding to the menu icon in a first execution window of the at least two execution windows.

13. The mobile terminal of claim 11, wherein, when a first icon of the at least two icons is an icon representing a data file that can be played, the controller plays the data file in a first execution window of the at least two execution windows.

14. The mobile terminal of claim 11, wherein the controller displays additional information about a first icon of the at least two icons in a first execution window of the at least two execution windows.

15. The mobile terminal of claim 11, wherein the controller is further configured to detect a terminate command on the display module; and
terminate an activated first application corresponding to a first icon of the at least two icons in response to the terminate command.

16. The mobile terminal of claim 11,
wherein a plurality of first applications is associated respectively with a plurality of first icons among the at least two icons, and
wherein the controller is further configured to display a plurality of first execution windows corresponding to the plurality of first icons simultaneously.

17. The mobile terminal of claim 16, wherein the controller is further configured to detect a terminate command on the display module; and
terminate the plurality of first execution windows simultaneously.

18. The mobile terminal of claim 11, wherein a first icon of the at least two icons representing a first execution window of the at least two execution windows is displayed next to at least one other icon of the at least two on the display module.

* * * * *